UNITED STATES PATENT OFFICE.

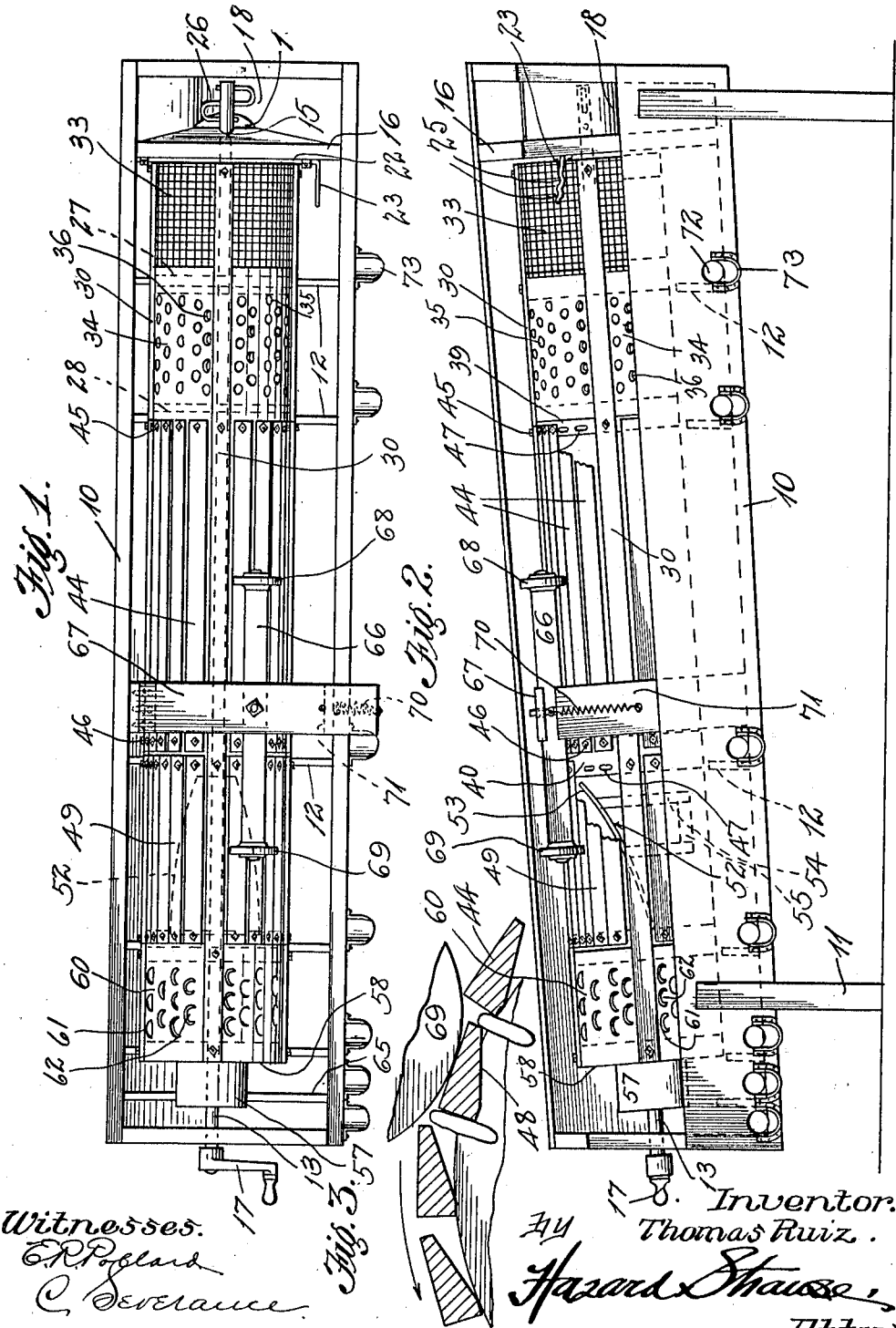

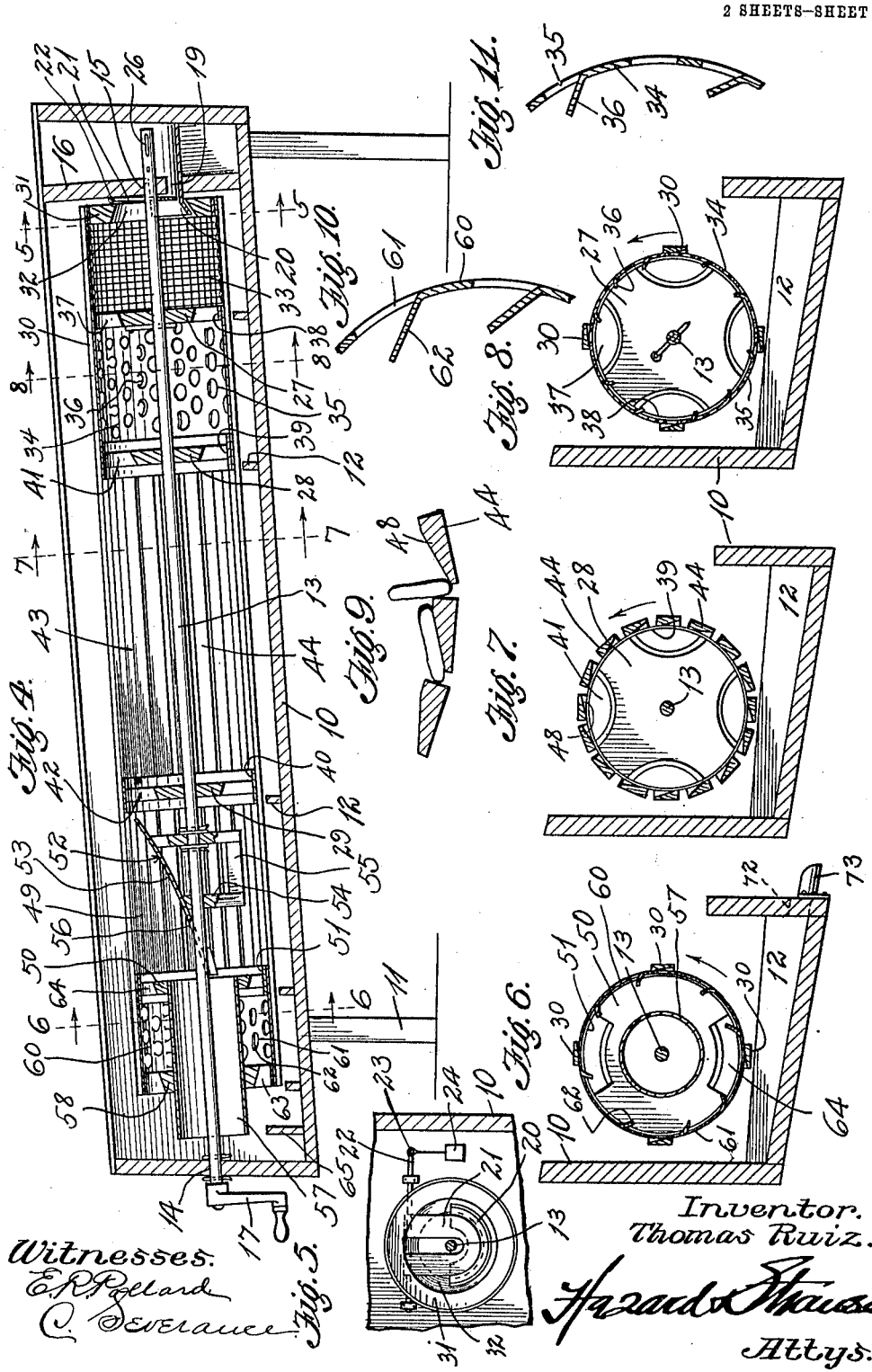

THOMAS RUIZ, OF OXNARD, CALIFORNIA.

BEAN-SEPARATOR.

1,034,931.  Specification of Letters Patent.  Patented Aug. 6, 1912.

Application filed May 23, 1911. Serial No. 628,952.

*To all whom it may concern:*

Be it known that I, THOMAS RUIZ, a citizen of the United States, residing at Oxnard, in the county of Ventura and State of California, have invented new and useful Improvements in Bean-Separators, of which the following is a specification.

This invention relates to improvements in bean separators and has particular reference to mechanisms that are adapted for the receiving of beans just as they are harvested and separating therefrom substances, as well as separating and collecting beans in different sizes.

It is an object of the invention to provide a mechanism which will receive beans after they are harvested and pass them over sizing devices and separating means which will be capable of removing all dirt, dross or foreign substances therefrom and will then permit the beans of smaller size to collect in one space, while the beans of medium size will be collected in another space, the remaining beans being further disposed and separated as found desirable.

It is also an object of the invention to provide a rotating sectional screen having different sized meshes and capable of selecting and separating the beans of different sizes in different places, the imperfect and poor beans being led to a place where they will not be collected with the good and useful beans.

It is also an object of the invention to provide a separating screen mechanism for beans which is provided with lifting means at various points for insuring the tipping of the beans through the proper sized apertures for their discharge.

It is a further object of the invention to provide a screen with slat inclosed portions, the slats being so shaped as to tend to tip the beans and permit those of the proper size to pass through slats.

It is a further object of the invention to provide a screen for separating beans having spaced slats for grading the beans and providing means for depressing slats at proper times for loosening and disengaging beans that become caught between the slats.

In the accompanying drawing forming a part of this specification, Figure 1 is a top plan view of the improved bean separator forming the subject matter of this invention, the cover thereof being removed. Fig. 2 is a side elevation of the bean apparatus, the cover and side wall partially removed. Fig. 3 is an enlarged detail sectional view of a portion of the screen which employs separate slats, and showing a portion of one of the rollers employed for depressing the slats in releasing caught beans. Fig. 4 is a longitudinal vertical central sectional view through the bean separator. Fig. 5 is a transverse sectional view taken upon the line 5—5, of Fig. 4, showing the inlet gate for the beans, a portion of the framing of the device being broken away. Fig. 6 is a transverse sectional view taken upon the line 6—6 of Fig. 4, the cover portion of the mechanism being removed. Fig. 7 is a transverse sectional view taken upon the line 7—7 of Fig. 4. Fig. 8 is a transverse sectional view taken upon the line 8—8 of Fig. 4. Fig. 9 is an enlarged detail sectional view through a group of adjacent slats showing the manner in which the beans are adapted to be tipped thereby. Fig. 10 is a fragmentary view in section of one portion of the screen mechanism showing the tongues adjacent to the openings of the screen for insuring the passage of the beans to said openings. Fig. 11 is a similar view but showing a portion of the screen employing a smaller mesh.

The details of the invention will now be more particularly described, reference being had to the drawing in which 10 indicates a casing, mounted upon suitable standards or legs 11, the said casing being mounted so as to incline from one end toward the other as clearly shown in Figs. 2 and 4. The floor of the casing 10 is also inclined from one side of the casing to the other as clearly indicated in Figs. 6, 7 and 8 so that the beans when separated tend to slide toward the lower edge of the casing, where outlet spouts are arranged opposite the various compartments. Mounted upon the inclined floor of the said casing 10 are a series of inclined partitions as 12 which divides the floor space into bean collecting compartments.

Within the casing 10 and extending longitudinally therein is a rotating separator screen device, the said screen device being mounted upon a longitudinally extending shaft 13. The said shaft extends parallel with the inclined floor or bottom of the casing 10 and at one end is journaled at 14 in the end wall of the said casing 10, while at the other end the said shaft is journaled at 15 in a suitable bearing provided in a transverse partition 16, arranged within the casing and near the end thereof. One end of the shaft 13 thus extends outside the casing and beyond the bearing 14 a sufficient distance to receive an operating handle 17, by which the shaft and the screen carried thereby may be rotated. Of course it will be understood that any rotating means may be secured to the end of said shaft for turning the same either by power or by hand as found desirable.

The space at the upper end of the casing 10, and between the end wall thereof and the partition 16 forms a hopper for receiving the beans that are to be separated. The said hopper is provided with a curved floor 18 at the bottom thereof, which extends to and through an opening 19 formed in the partition 16 below the said bearing 15.

The floor 18 projects through and somewhat beyond the opening 19 and is formed with an inwardly flaring delivery slip or spout portion 20 which extends into the adjacent end of the rotating screen carried by the shaft 13. The beans entering the hopper will thus be delivered into the adjacent end of the rotating screen over the spout portion 20. The entrance of the beans is somewhat modified and controlled by a swinging gate 21, which is mounted upon a transverse shaft 22 carried by bearings upon the inner face of the partition 16. The said shaft 22 extends above the opening 19 so that the gate may be swung opposite the said openings.

The gate is formed with a curved lower portion to approximately fit in the spout 20. The shaft 22 extends to one side of the screened mechanism and is provided with a laterally extending arm 23, which is provided with a weight 24 for holding the gate downwardly and against the inward rotation of the beans from the hopper.

The arm 23 may be provided with a series of indentations or recesses 25, so that the weight 24 may be adjacent to different parts thereon for varying the force with which the gate is held against the incoming beans, and the weight may be adjusted so that the gate will permit the beans to be fed into the screen at a proper speed. The end of the shaft 13 extends well into the hopper and is usually provided with stirring means for preventing the packing of the beans in the hopper. A simple way to accomplish this is shown in the drawing and particularly in Figs. 1 and 4 where a wire 26 is passed through apertures formed in the end of said shaft in such a way as to provide oppositely extending stirring loops as clearly shown in Fig. 1. These loops extend radially from the shaft 13 and will operate to keep the beans always in readiness for slipping through the opening 19 and into the screen.

The screen mechanism employed and carried by the shaft 13 is made up of sections having different meshes and different kinds of meshes according to the shape, kind or size of beans that are to be handled upon each particular section. The screen sections however are usually made of practically the same diameter so that the screen as a whole is approximately cylindrical as shown in the drawings. The cylindrical screen is supported upon the shaft 13 by means of heads 27, 28 and 29 which are arranged intermediate the length of the screen. The ends of the screen project considerably beyond the end heads 27 and 29 and this is especially true of the lower end of the screen with the result that the screen is given a shaking movement in its operation. Such shaking movement need not be very pronounced, and the mounting of the screen upon the heads set well in from the end thereof, is found to give sufficient vibration to the screen to make it effective in its operation.

The sections of the screen are held upon the heads 27, 28 and 29 by means of longitudinally arranged slats or bars 30 which preferably extend the full length of the screen mechanism and are fastened to the peripheries of the said heads 27, 28 and 29. The said slats or bars are preferably four in number and arranged diametrically opposite each other in pairs so as to thoroughly strengthen the screen parts. The spaces between the slats are filled by the various screen sections so as to receive and operate upon the beans to be separated.

The upper end of the screen is provided with a head 31 which is supported between the upper ends of the said slats or bars 30, the said head 31 being provided with a central opening 32 through which the lip 20 projects for introducing the beans into the upper screen section. The space between the upper heads 27 and the head 31 is covered and surrounded by a screen 33 which is preferably a wire mesh screen, the mesh of which is not a very large size. The screen is fastened around the peripheral portions of the said heads 29 and 31 and this screen is the first one to receive the beans discharged from the hopper.

The next section 32 of the screen is made up of a screen portion having large mesh and formed by fitting a perforated screen plate around the peripheral edges of the heads 27 and 28 as shown in Figs. 1, 2, 4 and 8. The apertures in the screen 34 are formed of larger size than the mesh of the screen 33 and opposite many of the apertures as 35 in the screen 34 are inbent tongues 36, set at an angle with respect to the screen. A desirable number of tongues 36 are provided by arranging the same opposite every other row of openings in the said screen 34 as indicated in the enlarged detail view of Fig. 11. The said tongues 36 may be stamped up from the metal of the screen in forming the apertures therein and are bent at such an angle that they tend to lift the beans upon the rising side of the screen and tip them so that if they are not too large they will readily fall through the apertures.

In order to permit the beans to pass from one compartment in the rotating screen to the next compartment, suitable peripheral apertures are provided in each of the transverse heads in the screen mechanism. Thus the head 27 is provided with peripheral apertures 37 which are of any desired shape but are preferably formed as indicated in the drawing, and the said apertures are made with flaring walls tapered so as to become longer toward the lower end of the screen and in the direction of the travel of the beans, the formation being such that the beans cannot become clogged in the openings. The heads 27, 28 and 29 are also provided with circumferentially extending strips forming rims 38, 39 and 40 to which the screens may be connected. The said rims are especially needed for holding the screen in proper position over the openings of the heads and thus maintain the cylindrical formation of the screen. The head 28 is provided with peripheral apertures 41 similar to the apertures 37 and the head 29 is provided with like apertures 42, the apertures in the three intermediate heads being thus practically the same and permitting of a gradual feeding of the beans from one screen compartment to the next as the screen is rotated. The rims 39 and 40 preferably project each side of their respective heads 28 and 29 so as to form attaching annular flanges and affording convenient means for securing the parts of the screen together, and in place.

The intermediate screen section between the heads 28 ad 29 is usually the longest section of the screen, since it is designed to remove the most desirable shaped and sized beans that are handled, and thus operate upon the major portion of the beans. The structure of the intermediate screen 43 is an important feature of the invention, and it affords an excellent means for handling the beans. The said screen 43 is made up of a series of longitudinally arranged slats 44, which preferably extend from one head 28 to the adjacent head 29 and are secured to the flanges of the rims 39 and 40 by means of bolts 45 and 46, which extend through apertures in the ends of said slats 44 and engage elongated slots 47 formed in the flanges of said rims 39 and 40. The slots 47 are elongated peripherally of the screen so as to make it possible to adjust the slats so as to have larger or smaller spaces between them as found desirable in permitting the passage of the proper sized beans.

The formation of the slats 44 themselves is also important since it contributes to the more perfect operation of the screen. The slats are formed with beveled inner faces 48 which render the said slats thinner at one edge than they are at the other. The inclined surfaces of the said beveled slats thus afford means for holding the imperfect thin beans so that they are readily tipped and can slip through the slots between the slats, the perfect beans continuing through the cylinder to their proper point of distribution.

The slats are so arranged that their thick edges rise from the bottom first in the rotation of the screen, so that they form projecting portions beyond the face of the adjacent beveled parts of the next slats, and the beans will be caught upon the said beveled face 48 somewhat as indicated in detail in Fig. 9 of the drawing and as the screen continues to turn the bean will be tipped into alinement with the spaces between the slats, facilitating the discharge of the beans of proper size. Of course those beans which are too large to pass through the slots of the screen 43 will be fed into the next compartment of the section of the mechanism.

The next section of the screen is formed by a slatted screen 49 which extends from the head 29 to a ring head 50 carried by the slats or bars 30 near the lower end of the screen mechanism. The ring head 50 is also provided with a peripheral rim 51 and the slats of the screen 49 are secured at their ends by a bolt and slot connection with the flanges of the rims 40 and 51 and in a manner similar to that described with respect to the slats 44. The slats of the screen 49 may thus be adjusted to suitable distances from each other for providing the desired spacing or mesh between them. Mounted within this section of the screen is an automatically operating chute device 52 which is pivotally mounted upon the shaft 13. The said device consists of an incline concave plate 53 carried by a framing 54 which is journaled upon the shaft 13, the portion which extends above the shaft being arranged to carry the said plate 53 and hold the same in inclined position as clearly indicated in Figs. 2 and 4. The lower part of the said frame is provided with a weight 55 which always insures the holding of the plate 53 in proper position and upon the upper side of the shaft 13. The lower ends of the plate 52 is slotted at 56 so as to extend upon each side of the shaft 13. It will be readily understood that the structure is such that the rotation of the shaft 13 will not operate to carry the plate 53 out of proper position and the weight 55 will tend to balance and maintain the parts in proper place. The concave upper surface of the said plate 53 is adapted to receive the beans or other material which may be carried upwardly by the slats of the screen section 49, and since broken beans and waste material are frequently caught by the slats of the screen 49, the plate 53 will catch and direct the same to a suitable discharge outlet so as to thus discard materials that are not wanted. The slats are spread for discharging the materials above said plate by suitable means to be hereinafter described. The said plate 53 directs the materials into the end of a cylindrical chute or discharge pipe 57 at the lower end of the screen. The cylindrical chute 57 is carried by the ring head 50 and a similar ring head 58 secured at the lower end of the bars 30. The spaces between the ring heads 50 and 58 are covered by the lowest section 60 of the screen which is usually provided with the largest mesh or holes of all. The apertures in this screen 60 are formed similar to those of the screen 34 but the holes 61 formed therein are very much larger than the holes 35 and tongues 62 are preferably arranged opposite each one of the apertures 61. The largest beans are usually able to pass through the apertures 61 and if any are too large they can escape through openings 63 formed in the ring head 58. The ring head 50 is also provided with similar openings as 64 for the passage of beans from the screen 49 to the screen 60. The beans that may be discharged from the openings 63 are caught in a space between one of the partitions 12 and a higher end partition 65 arranged near the lower end of the casing 10. The spout 57 discharges the broken beans and dross caught thereby into the space between the partition 65 and the wall of the casing.

As heretofore intimated it is desirable at times to be able to spread the slats of the sections 43 and 49 so as to free therefrom and discharge beans, materials and portions of beans that get fastened and caught between the slats thereof. This operation preferably performed by a mechanism made up of a longitudinally extending bar 66 which is carried by a pivoted transversely arranged bar 67 hinged to the back wall of the casing 10 at one end and extending across to the other or front wall of said casing as clearly shown in Figs. 1 and 2. The ends of the bar 66 carry rollers 68 and 69, which are held by the said bar 66 at points opposite the middle portions of the screens 43 and 49 and so arranged as to be capable of bearing upon and depressing the slats of said sections. The free end of the bar 67 is connected by a spring 70 with a standard 71 which extends upwardly from the casing 10 as shown in Fig. 2. The spring may be made of such a tension as to force the rollers 68 and 69 down upon the slats of the screen and depress them somewhat as indicated on an enlarged scale in Fig. 3. The effect of depressing the slats successively will be readily understood by reference to said Fig. 3 and it will be observed that the said beans or other materials that may become wedged between the slats, will be so loosened as to insure their falling from place. The mounting of the rollers 68 and 69 is thus such that they will be automatically caused to depress the slats of the screen successively as the screen is rotated.

The screen mechanism above described is adapted to receive beans just as they are received from the field after they have been harvested and shelled and as the beans pass through the screen from the hopper, any dirt or foreign materials of small size will be immediately removed by the screen 33. The beans will continue to work downwardly in the screen as the screen is rotated and the small beans will be caught by the tongues of the screen 34 and pass through the apertures 35 thereof. The next size of beans will be separated by the next section, namely the screen 43 which is provided with slats set to handle the beans of usual or normal size and which are preferable both for seeding purposes as well as for eating. The shape of the slats in this section will insure the passing of all beans through the mesh of the screen that are of the proper size. The beans will next pass into the section 49 where some will pass through the mesh thereof and broken pieces and beans that are not desired for any purpose will usually be thrown upon the movable chute plate 53 and directed into the cylindrical discharge chute 57 so as to be deposited separately from any of the other beans. The largest beans of all will pass through the mesh of the section 60. The compartments formed by the partitions 12 beneath each screen section will collect the beans so separated and outlet openings 72 with spouts or chutes 73 therein, will facilitate the discharge of the beans from the said compartments into bags, baskets or other receptacles.

The separator described is of course especially well adapted for lima beans or beans of a more or less flat shape.

What I claim is:

1. A bean separator comprising a rotating screen having parallel yielding slats incorporated in its peripheral portion, and means engaging the exterior surface of said slats and adapted to press them inwardly as the screen is rotated for discharging materials caught between them.

2. A separator comprising a rotating screen having sections some of which are formed of longitudinally extending slats of rectangular material, one of the inner edges of each slat being beveled for tending to tip the materials carried within the screen, means for adjustably securing the ends of the slats in position, the central portions of said slats being capable of yielding, and means for pressing upon the said central portions of the slats for separating them and insuring the dropping of materials that may have been caught between them.

3. A bean separator comprising a rotating screen mechanism having sections, some of which are provided with parallel slats with spaces between them for the escape of beans, rollers adapted to engage the central portions of said slatted sections, and means for carrying said rollers and forcing them upon the said slats.

4. A bean separator comprising a rotating screen mechanism having slatted sections, parallel slats forming said sections and having their central portions unsupported, a bar extending longitudinally of said sections and having depressing wheels mounted thereon and adapted to engage the said slats, and a spring actuated beam mounted adjacent to the screen and carrying the said bar for normally forcing the rollers upon the slats to depress and separate the same.

5. A separator comprising a casing, a shaft mounted longitudinally therein, the lower floor of the casing being inclined from one end toward the other and tipped from one side of the casing toward the other, and baffle plates extending transversely of the said floor, the said casing having discharge openings adjacent to one end of each baffle plate and a sectional screen carried by said shaft, the sections of the said screen being arranged to extend approximately from one baffle plate to the other whereby the materials permitted to pass through each screen section will be caught and diverted by the baffle plate below the same.

6. A bean separator comprising a screen having sections formed with longitudinally arranged slats, means for depressing the said slats to direct materials that have been caught between them, comprising rollers, and means for forcing the said rollers against the slats as the screen is operated.

In witness that I claim the foregoing I have hereunto subscribed my name this 15th day of May, 1911.

THOMAS RUIZ.

Witnesses:
EDMUND A. STRAUSE,
E. STADLMAN.

---

Copies of this patent may be obtained for five cents each, by addressing the "Commissioner of Patents, Washington, D. C."